(12) United States Patent
Vedder (10) Patent No.: US 9,368,967 B1
(45) Date of Patent: Jun. 14, 2016

(54) CONVERTER FOR CONNECTING MULTIPLE AC VOLTAGE SOURCES TO A UTILITY GRID WITHOUT FIRST RECTIFYING THE AC TO A COMMON DC BUS

(71) Applicant: Dietrich Vedder, Cambria, WI (US)

(72) Inventor: Dietrich Vedder, Cambria, WI (US)

(73) Assignee: Dietrich Vedder, Cambria, WI (US)

( * ) Notice: Subject to any disclaimer, the term of this patent is extended or adjusted under 35 U.S.C. 154(b) by 366 days.

(21) Appl. No.: 14/173,943

(22) Filed: Feb. 6, 2014

(51) Int. Cl.
*H02J 3/00* (2006.01)

(52) U.S. Cl.
CPC ........................................ *H02J 3/00* (2013.01)

(58) Field of Classification Search
CPC ......................................................... H02J 3/00
USPC .............................................................. 307/43
See application file for complete search history.

(56) References Cited

U.S. PATENT DOCUMENTS

| | | | |
|---|---|---|---|
| 4,468,725 | A | 8/1984 | Venturini |
| 4,833,588 | A | 5/1989 | Schauder |
| 4,896,091 | A | 1/1990 | Kislovski |
| 5,005,115 | A | 4/1991 | Schauder |
| 5,010,471 | A | 4/1991 | Klaassens et al. |
| 5,892,664 | A | 4/1999 | Vedder |
| 6,122,182 | A | 9/2000 | Moisin |
| 8,049,351 | B2 | 11/2011 | Mahawili |
| 8,178,987 | B2 | 5/2012 | Mahawili |

*Primary Examiner* — Robert Deberadinis (57) ABSTRACT

Diodes and switching means as well as an autotransformer connect multiple AC sources of variable frequency and voltage to the utility grid, without first rectifying and thereby transferring the AC input energy to a common DC bus. Instead, the individual positive and negative AC input half waves or parts of those half waves, if and when they occur during a particular time interval, are injected into the positive or negative half wave of the utility AC power directly and respectively. The amount of energy transferred may be controlled by a microprocessor. Assuming the prime mover that generates AC voltages in multiple coils is a windmill, then the required circuitry to accomplish this energy transfer will be physically small enough to allow that circuitry to reside in the windmill itself, and thereby this energy conversion method significantly simplifies the installation of a windmill that uses this energy conversion method.

13 Claims, 10 Drawing Sheets

CONVERTER FOR CONNECTING MULTIPLE AC VOLTAGE SOURCES TO A UTILITY GRID WITHOUT FIRST RECTIFYING THE AC TO A COMMON DC BUS

BACKGROUND OF THE INVENTION

1. Field of the Invention

This invention relates to transferring electric power generated by multiple sources of AC power to a utility grid without first rectifying and thereby first transferring the electric power of all AC inputs into a common two wire DC bus.

2. Detailed Background of the Invention

Figure 9:
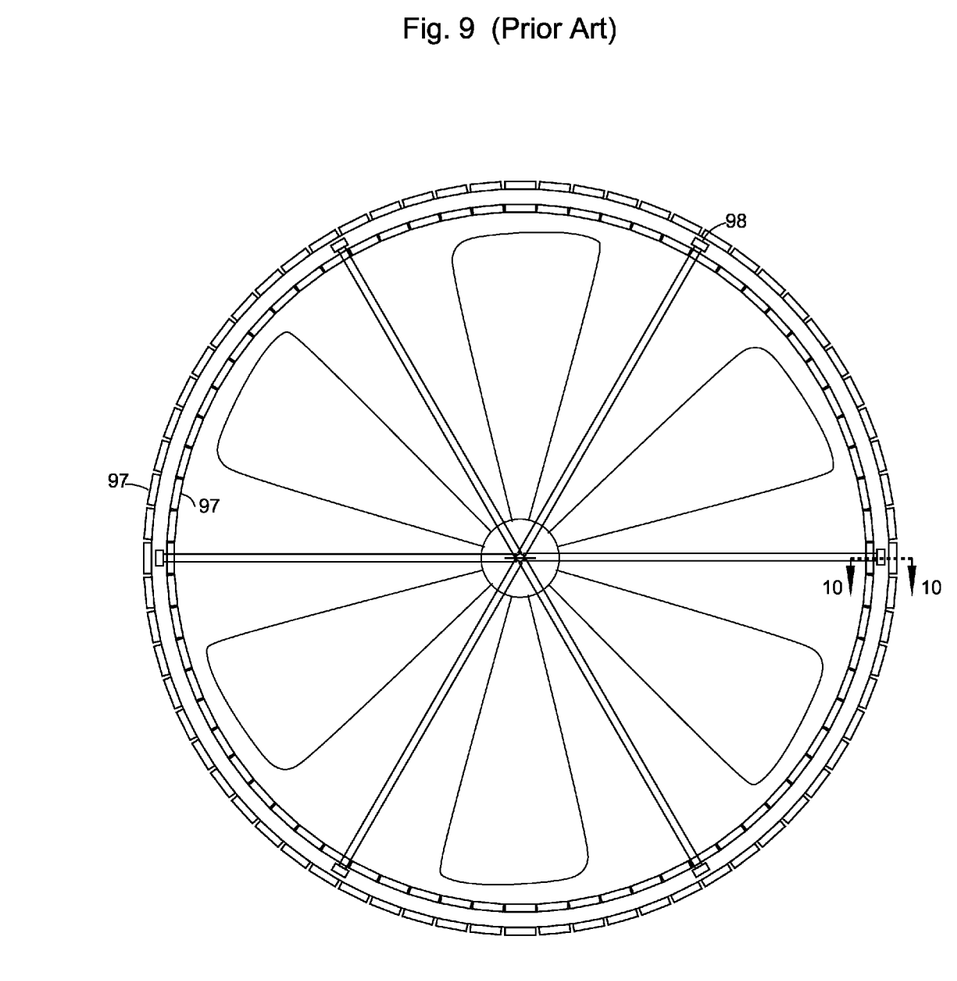
FIG. 9 illustrates prior art, it displays the generator structure that was discussed in the background material and how that structure relates to the windmill rotor. There are two stationary rings of coils 97, which form a U-shaped channel within which permanent magnets 98 move. The permanent magnets are attached to the periphery of the windmill rotor.

Two patents, U.S. Pat. Nos. 8,049,351 and 8,178,987, for horizontal axis windmill designs, by Mahawili describe an electrical generating structure with two major components that are shown in FIG. 9. First, there are rotating permanent magnets attached to the periphery of a windmill rotor and second there is a stator constructed from a multiplicity of coil pairs, which are located in a stationary ring structure surrounding the periphery of the rotor of the windmill. (The word "stationary" means stationary with respect to the rotor, the windmill itself still turns around its vertical axis for the purpose of facing into the wind.)

Figure 10:
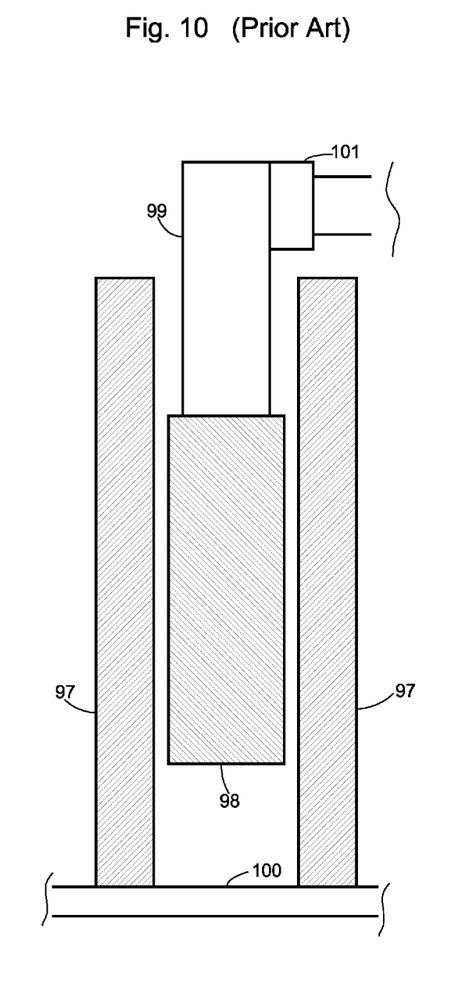
FIG. 10 also illustrates prior art, it shows a more detailed cross-section of the U-shaped channel. The coils 97 are attached to mounting base 100, and the magnets 98 are attached to magnet holders 99, which are themselves attached to the rim 101 of the windmill rotor.

As shown in a cross-sectional view in FIG. 10, a pair of coils 97 in the stator form a U-shaped channel within which the permanent magnets 98 move. When viewing FIG. 10 the reader should assume that the movement of the magnet is perpendicular to the plane of the paper, i.e. the movement of the magnet is either into or out of the paper. The movement of these magnets generate voltages in the coil pairs by Faraday's law, which thus convert the mechanical energy of the windmill into electrical energy.

This windmill design has been implemented by the firm Windtronics and the design consists of 6 permanent magnets rotating within a U-shaped channel of 68 coil pairs. The fact that the number of permanent magnets is much smaller than the number of coil pairs in the stator leads to an unusual property. As a permanent magnet flies by a coil pair, that coil pair generates one complete AC voltage wave (or cycle) consisting of one positive half wave and one negative half wave. Another AC voltage wave is not generated in a particular coil pair until the next permanent magnet flies by. So each coil pair generates an AC voltage wave only some of the time, but looking at all coil pairs together, there are always some coil pairs that are generating AC voltage waves at any moment in time. Also, the fact that the number of stator coil pairs is not divisible by 3, leads to the property that the voltage waves generated by one permanent magnet pair has a three phase relationship with the voltage waves generated by the other two permanent magnet pairs. It should be mentioned that the six permanent magnets are equally distributed around the periphery of the rotor as shown in FIG. 9; therefore, the angular distance between adjacent magnets is 60 degrees. A permanent magnet pair is defined as two magnets that are located at opposite sides of the periphery.

For the current implementation by Windtronics, in order for the electric power generated by this windmill to be transferred to the utility grid, the AC voltage waves generated by each of the 68 coil pairs are rectified into DC by 68 separate full wave rectifiers consisting of 4 diodes each physically located next to each coil pair. The DC output of each of these full wave rectifiers is connected to a two wire DC bus also located around the periphery, which is connected through slip rings and cabling to a conventional commercially available DC to AC inverter for connection to the utility grid, which is typically located in a building located near the windmill.

It is the object of this invention to improve on the circuits that transfer the AC power generated by the windmill, such that the rectifying step, which currently transfers all AC power through full wave rectifiers to a common DC bus, is eliminated and all input AC half waves are separately and directly injected into the utility grid. The elimination of the rectifying step into a common DC bus increases the efficiency of the conversion process by eliminating some of the diodes that would otherwise be used and therefore eliminates the losses that these diodes would incur. It is an additional object of this invention to make this converter small enough, so that all the required components fit into the windmill itself, such that the windmill can be connected directly to the utility grid; which is a desirable feature, because all the work and expense of providing a separate inverter will be eliminated.

3. Description of the Prior Art

U.S. Pat. No. 6,122,182 by Mihail Moisin describes an AC to AC scheme for powering gas discharge lamps. The cited patents: U.S. Pat. No. 4,468,725 by Colin Schauder, U.S. Pat. No. 4,896,091 by Andre Kislovski, U.S. Pat. No. 5,005,115 by Colin Schauder and U.S. Pat. No. 5,010,471 by J. Ben Klaassens et. al. are AC to AC converter systems of various kinds; but none of them deal with the task of injecting variable frequency alternating current pulses from a multiplicity of sources into the constant frequency utility grid.

This invention is also related to U.S. Pat. No. 5,892,664 by this inventor (Dietrich Vedder), which also deals with the task of transferring variable frequency AC power into a utility grid, but uses complete rectification of the input AC power.

SUMMARY OF THE INVENTION

The present invention is an AC to AC converter that transfers electrical energy from multiple AC power sources of variable voltage and frequency to a provider of AC power of constant voltage and constant frequency for co-generation purposes. The provider of electric power may be an electric utility or a stand-alone producer of electric power that produces substantially larger amounts of power than is co-generated.

The multiple sources of AC electric power are connected via switching means to one of several taps of an autotransformer that is directly connected to the utility power source of constant voltage and frequency. Now assume that the maximum output voltage of the input AC is higher than the maximum voltage present at a particular tap of the autotransformer; then the switching means will connect those AC sources to that particular tap of the autotransformer, such that current will flow directly into the utility grid. The switching means are controlled, such that a current path is only open when the voltage wave of the utility power source is either in the middle of the positive voltage wave for the purpose of accepting positive current pulses from the AC power sources, or in the middle of the negative voltage wave for the purpose of accepting negative current pulses from the AC power sources. The middle of the positive or negative voltage wave of utility power should be understood to mean about 60 to 120 electrical degrees in the middle of the 180 degree width of the positive or negative half wave. The frequency of the AC power sources may be less than the frequency of the utility power, equal to the frequency of utility power or greater or significantly greater than the frequency of utility power. A positive half wave or part of a positive half wave of any AC input source will only conduct current into the utility grid, if it lines up with the middle of the positive voltage half wave of utility power. A negative half wave or part of a negative half wave of any AC input source will only conduct current into the utility grid, if it lines up with the middle of the negative voltage half wave of utility power. For this reason a little less than half of any of the voltage half waves generated by the multiplicity of AC input sources will cause current to flow into the utility grid. However, there will always be current flow into each utility AC half wave, because there always will be some input AC half waves that will line up with them.

When comparing the method disclosed by this invention against the conventional method of injecting the energy generated by the windmill into the utility grid using a common DC bus and a DC to AC inverter, then one realizes that one of the main functions of the inverter that chops the DC into AC for the purpose of injecting those newly created AC pulses into the utility grid has been replaced in this invention by the naturally produced AC pulses produced by the windmill generation system itself; thus a considerable simplification of the energy transfer apparatus from windmill to utility grid has been achieved.

The switching means are controlled using a microprocessor, such that the power transferred into the utility grid is optimized. The optimization of transferred power is done by the well-known method of periodically testing whether the optimum power transfer point is above or below the current operating point. If the current operating point is not at the optimum point, then the control mechanism moves the operating point towards the optimum point.

The electric power transfer is controlled, i.e. is increased or decreased, by using two control methods as appropriate. One control method increases or decreases the width of each conduction period within each utility half wave; the other control method switches between different taps of the autotransformer, such that the operating voltage is either increased or decreased. For example, if the power generating windmill increases its rotational speed, then the AC input voltages will increase and the conductive path may need to be switched to an autotransformer tap with a higher voltage. Decreasing wind speed may lead to switching to a lower voltage tap of the autotransformer.

Injecting current pulses into the utility grid in the discussed manner generates some harmonics that need to be filtered out. This is done with a capacitor and perhaps an inductor at the utility side of the autotransformer.

DESCRIPTION OF THE INVENTION

Description of the First Embodiment

Figure 1:
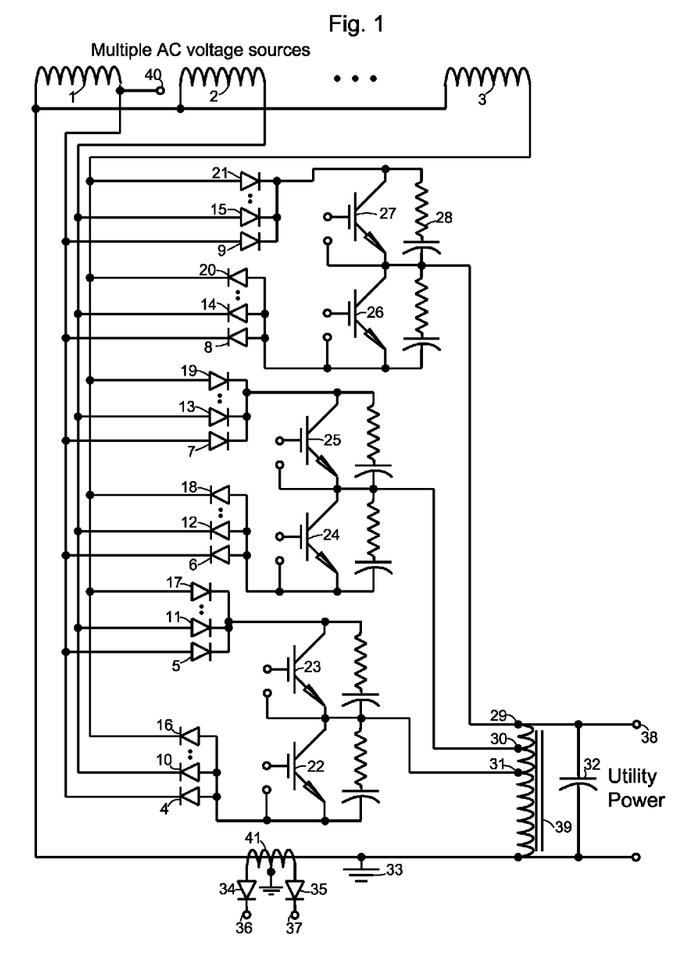
FIG. 1 is a schematic of one embodiment of the invention. Three pairs of Insulated Gate Bipolar Transistors (IGBTs) are shown; each pair being responsible for switching currents at a particular voltage level. One IGBT in a pair is responsible for positive half wave switching and the other IGBT is responsible for negative half wave switching. Diodes are used to isolate the IGBTs from each other, the diodes are also used to isolate the voltage generation coils from one another. No control circuits for the IGBTs are shown in this figure.

FIG. 1 shows one embodiment of an electrical energy transfer circuit in accordance with the present invention. Three voltage sources labeled 1, 2 and 3 are shown and represent a number of voltage sources that may reach as high as 100 or more. The prime mover that generates a voltage in those voltage sources may be a windmill or other prime mover and is not shown. One end of each coil (voltage source) 1, 2 and 3 is connected to ground 33 and to the autotransformer 39. The other end of coil 1 is connected to the six diodes 4, 5, 6, 7, 8 and 9. Each of those diodes is connected to its own switching IGBT as follows: Diode 4 connects with IGBT 22, diode 5 connects with IGBT 23, diode 6 connects with IGBT 24, diode 7 connects with IGBT 25, diode 8 connects with IGBT 26 and diode 9 connects with IGBT 27 as shown. The six IGBTs are divided into three pairs. IGBT pair 22 and 23 is connected to and supports the lowest voltage tap 31 of the autotransformer, IGBT pair 24 and 25 is connected to and supports the middle voltage tap 30 of the autotransformer and IGBT pair 26 and 27 is connected to and supports the high voltage tap 29 of the autotransformer. Within each pair of IGBTs, one of them supports the positive voltage half wave and the other one supports the negative voltage half wave of utility power. So IGBTs 23, 25 and 27 with their connected diodes support the positive voltage half wave of utility power and IGBTs 22, 24 and 26 with their connected diodes support the negative voltage half wave of utility power. As just described, the six diodes 10, 11, 12, 13, 14 and 15 support coil 2 and diodes 16, 17, 18, 19, 20 and 21 support coil 3. All IGBTs are protected, when turning off, against inductive over-voltages by a resistor and a capacitor labeled 28. A current transformer 41 that is center-tapped delivers pulses that indicate the size of the current flowing to or from the autotransformer and the utility connection. The magnitude of these current pulses indicates the amount of energy transferred into the utility grid.

Figure 2:
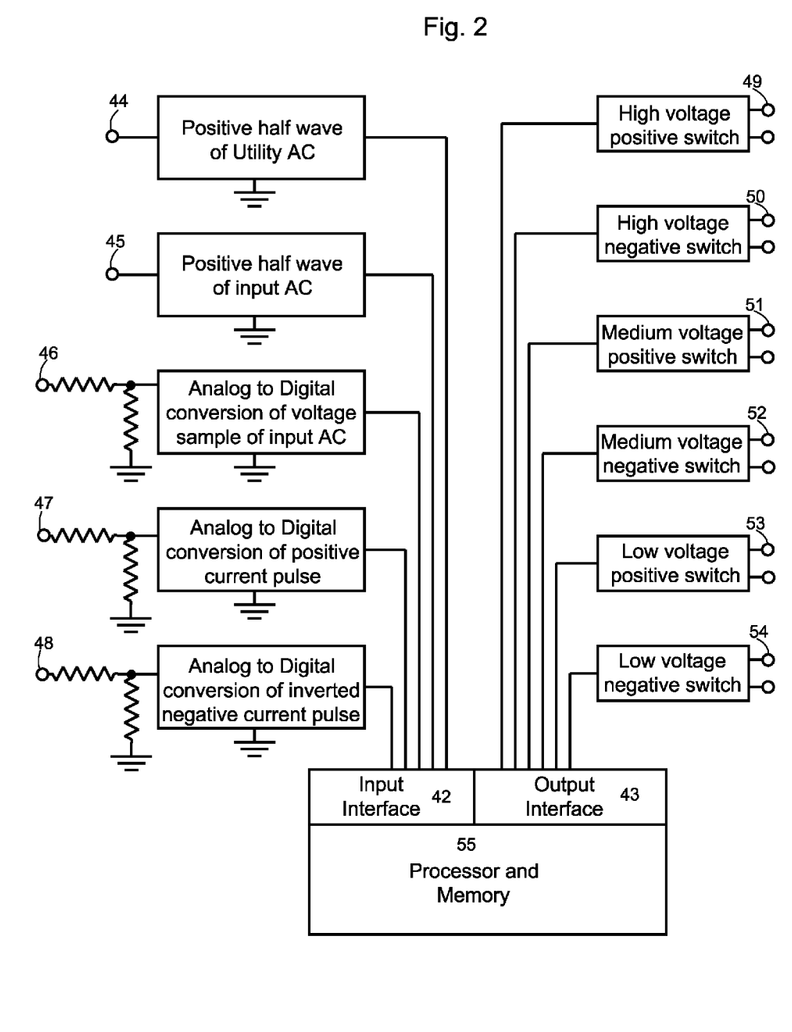
FIG. 2 gives a schematic of the control structure showing the inputs used. On the basis of these inputs, control decisions are made. In addition, six control outputs are provided, one each for the six IGBTs shown in FIG. 1.

FIG. 2 illustrates the control structure for the circuit in FIG. 1. This structure consists of a microprocessor and memory 55 with input interface 42 and an output interface 43. Five separate measurement interfaces (inputs) are provided. Interface 44 will be connected to point 29 on the autotransformer to find the zero crossings of the utility voltage wave, which establishes the timing of the switching operation of the circuit. Interface 45 will be connected to point 40 of coil 1; through this interface the timing and frequency of the input voltage wave forms are established. Interface 46 is also connected to point 40 of coil 1 for the purpose of measuring the magnitude of the generated voltage in coil 1. Interface 47 connects with point 36 of the current transformer to measure the size of the positive current half wave and interface 48 connects with point 37 to measure the size of the negative current half wave. The control outputs 49 and 50 control the operation of the high voltage IGBTs 27 and 26 respectively; control output 49 is for the positive voltage half wave and control output 50 is for the negative voltage half wave. Similarly, control outputs 51 and 52 control the medium voltage IGBTs and control outputs 53 and 54 control the low voltage IGBTs.

Figure 3:
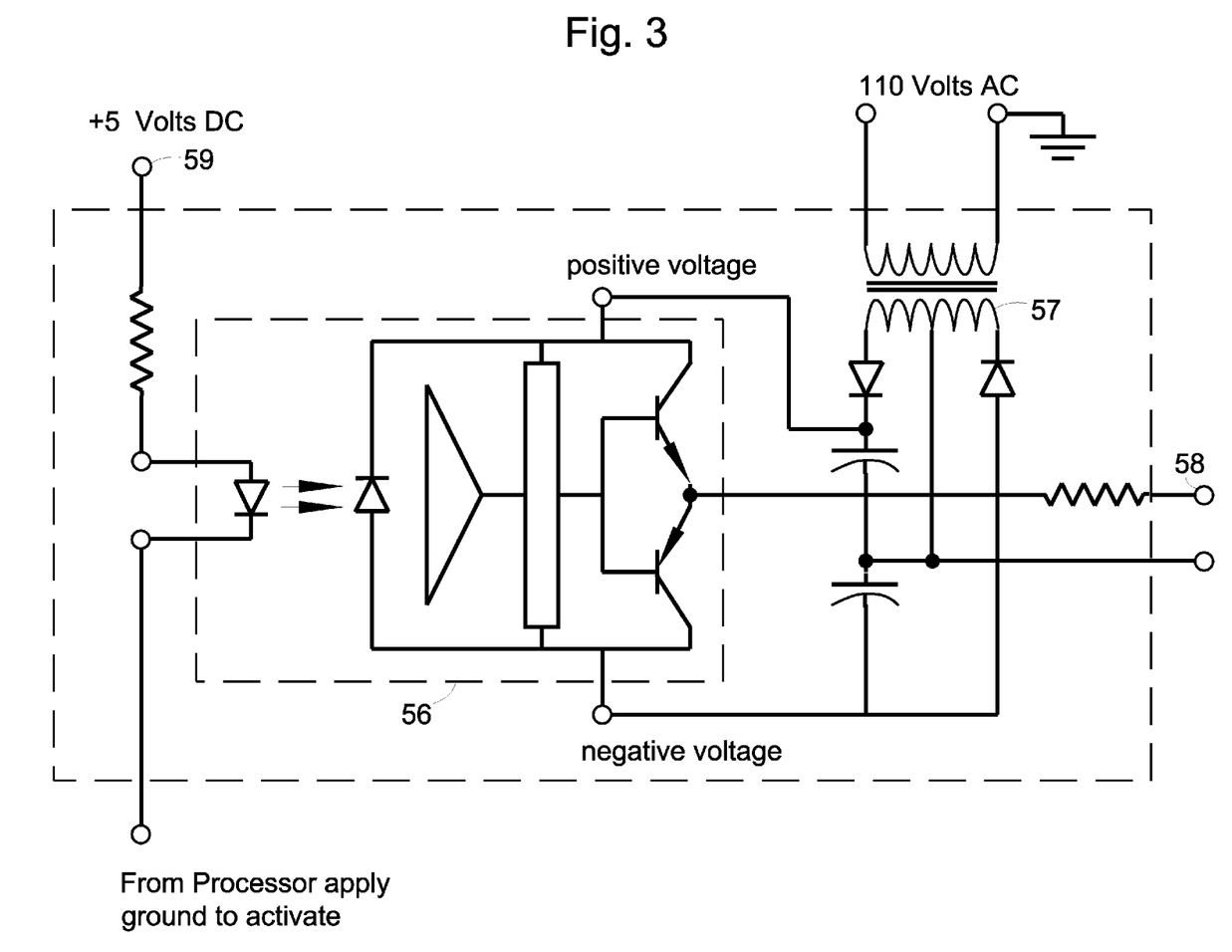
FIG. 3 shows a drive circuit for an individual IGBT that ensures voltage isolation for that IGBT due to employment of an optical coupler.

The control outputs do not connect directly with each IGBT; an optical coupler circuit shown in FIG. 3 ensures that each IGBT is electrically isolated from the control circuits. There is an optical coupler circuit for each IGBT. This circuit consists of an optical coupler 56 with input 59. This input 59 connects with one of the control outputs shown in FIG. 2. The optical coupler has its own power supply 57 and provides control output 58 for its assigned IGBT.

Figure 4:
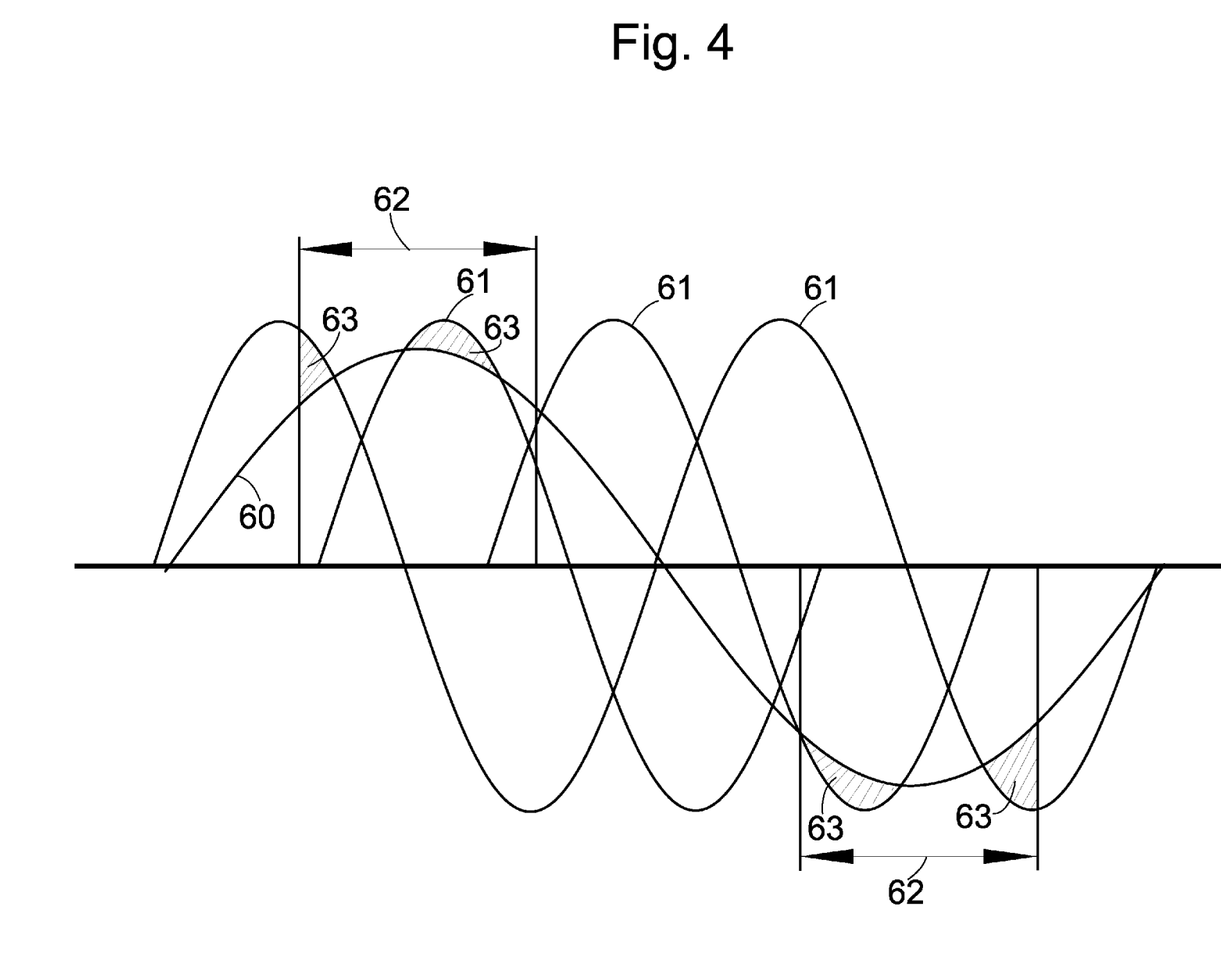
FIG. 4 shows the relationship between the input AC voltage waves and the output (utility) voltage wave. The cross hatched areas show when conduction of current takes place. Notice that the input AC voltage waves are shown to reflect a three phase relationship among one another.

FIG. 4 shows the voltage waveforms in relation to each other. Waveform 60 represents the voltage waveform provided by the utility. Voltage waveforms 61 represent the input voltage waveforms, all three phases of the input voltage waveforms are shown. The conduction interval 62 is positioned in the center of the utility voltage waveform on both the positive and the negative side. Conduction, and therefore transfer of electrical energy, only occurs in that interval. The cross hatched areas 63 show the times when conduction takes place. The actual current flow is limited by the inductance and the resistance of the voltage generating coils themselves.

Operation of the First Embodiment

When the circuits of the first embodiment are turned on by connecting the autotransformer 39 to the AC power provided by the utility, then the first thing the program in the microprocessor 55 (FIG. 2) does is to make a number of measurements through terminal 44 (FIG. 2) of the zero crossings of the alternating voltage provided by the utility. By establishing the time differences between those zero crossing measurements, the program establishes whether it is dealing with 60 cycle power, which is associated with a zero crossing interval of 8.333 milliseconds, or with 50 cycle power, which is associated with a zero crossing interval of 10 milliseconds or with electric power using some other frequency. In addition to repeatedly measuring the zero crossing intervals, it compares those multiple measurements to make certain that the frequency provided by the utility is stable, i.e., the zero crossing intervals are identical in duration. The program then tests the voltage of the representative sample of the input ac voltage through terminal 46, it also checks that the measurements of the current (through terminals 47 & 48), into or out of the utility grid are still zero, because no switching has yet been done to connect the input to the utility power connection. This checking of measured values is continued for perhaps 10 or 20 seconds to ensure that all the transient events that occur as a result of turning on the utility power have settled down. Then the program in the microprocessor compares the voltage of the input sample through terminal 46 and compares it against the voltage of all three of the autotransformer taps. (The utility voltages are preset in the program.) It will then select the autotransformer tap, the voltage of which is a few volts below the voltage value of the input.

The program is now ready to transfer energy to the utility. Assuming that the low voltage tap 31 (FIG. 1) of the autotransformer was selected, it will now work with the IGBTs 22 and 23 that are associated with that autotransformer tap, by turning on IGBT 23 during the peak period of the positive half wave and by turning on IGBT 22 during the peak period of the negative half wave. The initial period when the respective IGBTs are on will be something like 4 milliseconds for the 60 cycle case, centered at the peak of the half wave. Current measurements are then made during each conduction cycle, i.e. for both the positive and the negative half wave. Input voltage measurements are made as well. If the current and voltage measurements increase for successive half waves, then the width of the conduction cycle will be increased to allow more current to flow. If the current and input voltage measurements decrease, then the conduction cycle is narrowed, because not enough energy is produced by the windmill to sustain the input voltage.

Switching between individual taps of the autotransformer is initiated by the program in the microprocessor 55 (FIG. 2), if one of two events happens. Assume first that we started with the middle voltage tap 30 of the autotransformer. If the input voltage increases to the point where it exceeds the value of the voltage of the high voltage tap 29, then the program, will simply switch for subsequent half cycles to the two IGBTs 26 & 27 that are associated with the high voltage tap, and after making that change, the algorithm followed is the same as explained above. If the input voltage decreases to the point where it is no longer larger by several volts than the voltage of the middle voltage tap of the autotransformer, then the program will switch to the two IGBTs that connect to the low voltage tap 31. Once that switch is made for subsequent half waves, then the algorithm will make the conduction interval for each half wave wider or narrower as the measurements suggest and as previously explained.

There are two cases left to discuss: What happens when the input voltage falls below the value of the low voltage tap 31 of the autotransformer? In that case, no switching during the conduction interval will take place and the program will continue to take measurements until the input voltage increases, so that energy transfer can again take place. What happens when the input voltage exceeds some voltage boundary value well above the voltage of the high voltage tap 29 of the autotransformer? At that point the program will have to shut the windmill down, because we must have an extremely high wind condition and the output of the windmill needs to be connected to energy dump resistors provided for the task of slowing the windmill down.

Description of the Second Embodiment

Figure 5:
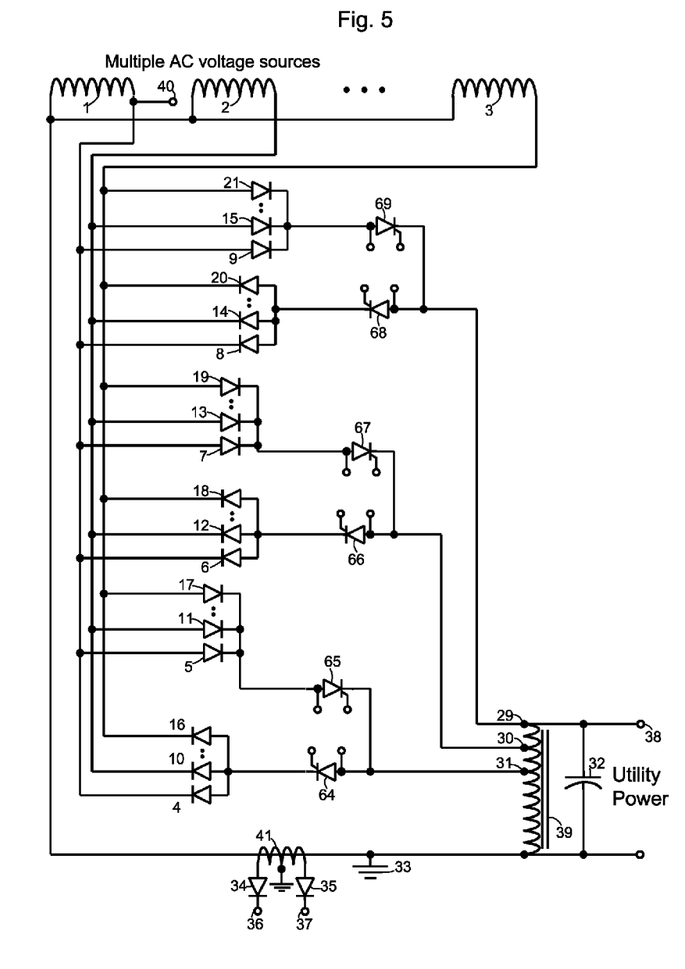
FIG. 5 shows another embodiment of the invention, which applies to the case where the frequency of the input AC is considerably higher than the frequency of the utility power. As a result Silicon Controlled Rectifiers (SCRs) are used to do the switching.

FIG. 5 illustrates the second embodiment. In this embodiment it is assumed that the frequency of the AC input voltage waves are considerably higher than the frequency of the utility voltage wave. This assumption allows the replacement of the IGBTs, shown in FIG. 1, by SCRs. This change has the consequence of changing the treatment of the conduction interval, which will be explained in detail below when FIG. 7 is discussed.

Figure 6:
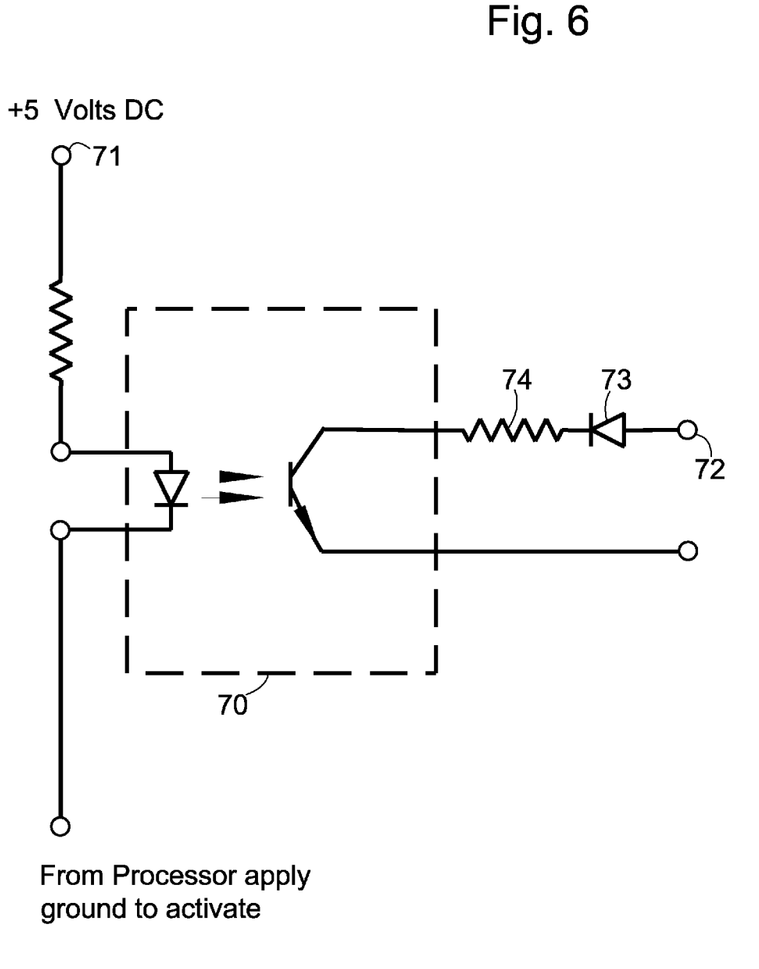
FIG. 6 shows an optically coupled transistor to drive each SCR shown in FIG. 5.

FIG. 6 shows a simple optical coupler 70 with input 71 and output 72 for driving the inputs of the SCRs. The diode 73 is needed to protect the optical coupler from the periodic negative voltages that will appear at the anode of the SCR. The resistor 74 is dimensioned to limit the trigger current into the SCR. There must be one optical coupler per SCR. The inputs of these optical couplers must be connected to one of the six control output ports 49-54 shown in FIG. 2.

Figure 7:
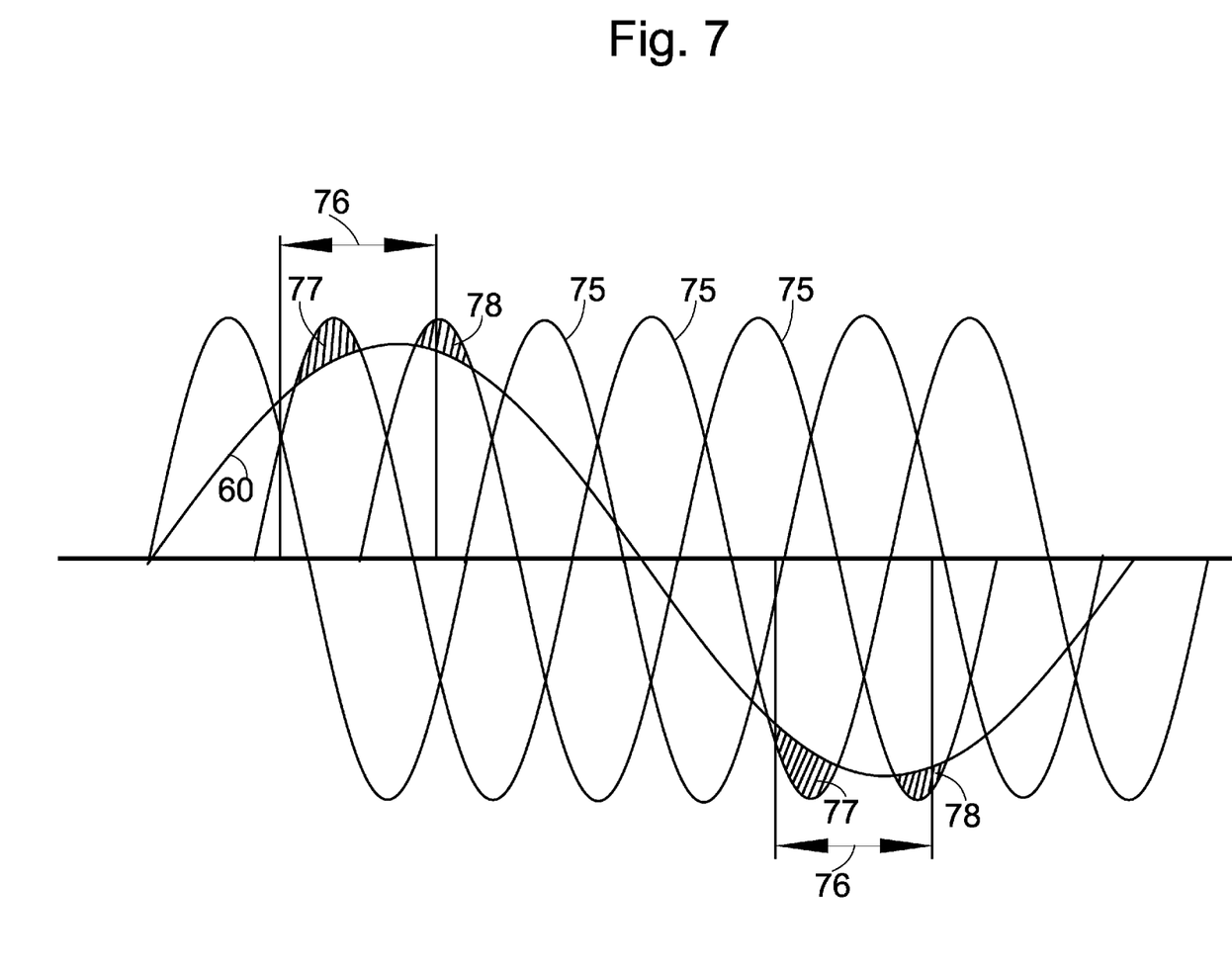
FIG. 7 shows the relationship between the input AC voltage waves and the output (utility) voltage wave for the embodiment shown in FIG. 5. Again, the cross hatched areas show when conduction takes place. The SCR trigger interval is not centered in the middle of the utility voltage wave, it is moved to the front of the voltage wave to avoid causing short circuits at the tail end of the utility voltage wave. Again, the input AC voltage waves are shown to reflect a three phase relationship among one another.

FIG. 7 illustrates the waveform relationships for the embodiment illustrated in FIG. 5. Again waveform 60 is the utility waveform and waveforms 75 are the AC input waveforms. Again all three phases of the input are shown. The frequency of the input waveform is higher; therefore, the input waves are narrower than shown in FIG. 4. The SCR trigger intervals 76, shown for both the positive and negative waveform, are not symmetrical with respect to the utility waveform; they extend only a little bit beyond the peak of the utility waveform. Also notice that cross hatched areas 78 extend beyond the trigger interval, because SCRs have the property of staying on until the main current through them is zero, which does not happen until the input voltage is below the utility voltage. Since the chosen devices are SCRs that cannot be turned off by a control signal, we must limit this circuit to the cases where the input voltage waveforms are narrow enough with respect to the utility waveform, such that the input voltage is guaranteed to dip below the utility voltage before the zero crossing of the utility voltage.

Operation of Second Embodiment

The operation of the second embodiment is identical to the operation of the first embodiment except for this difference. Due to the fact that Silicon Controlled Rectifiers (SCRs) cannot be turned off by the control signal, the triggering interval 76 (FIG. 7) for the SCRs is asymmetrical with respect to the peak of each half wave of utility power. So, for the purpose of determining timing positions within each half wave, assume that each half wave starts at zero electrical degrees, has its peak at 90 electrical degrees and is back to zero at 180 electrical degrees. The interval during which SCR triggering takes place starts at something like 45 degrees and is pulled back to something like 30 degrees to increase current and is pushed forward to something like 50 or 60 degrees to decrease current. But the termination of the triggering interval needs to take place at about 100 degrees, so as to make sure that all input voltage waves cross the voltage wave of the currently used autotransformer tap before its zero crossing at 180 degrees. If that does not happen, then we are injecting a positive current during a negative voltage wave or injecting a negative current during a positive voltage wave, either scenario causes a potential short circuit that needs to be avoided. The exact degree value of the end of the SCR triggering interval may be varied somewhat by taking into account the width of the input pulses. If the input voltage pulses are quite narrow, compared to the utility power half wave, i.e. the input frequency is quite high, then we can push it a bit beyond 100 degrees.

Even though the SCR triggering interval is not symmetrical with respect to the peak of the half wave of utility power, the actual conduction interval that results from this asymmetric triggering interval is approximately symmetric with respect to the peak of the half wave of utility power as FIG. 7 illustrates.

Description of the Third Embodiment

Figure 8:
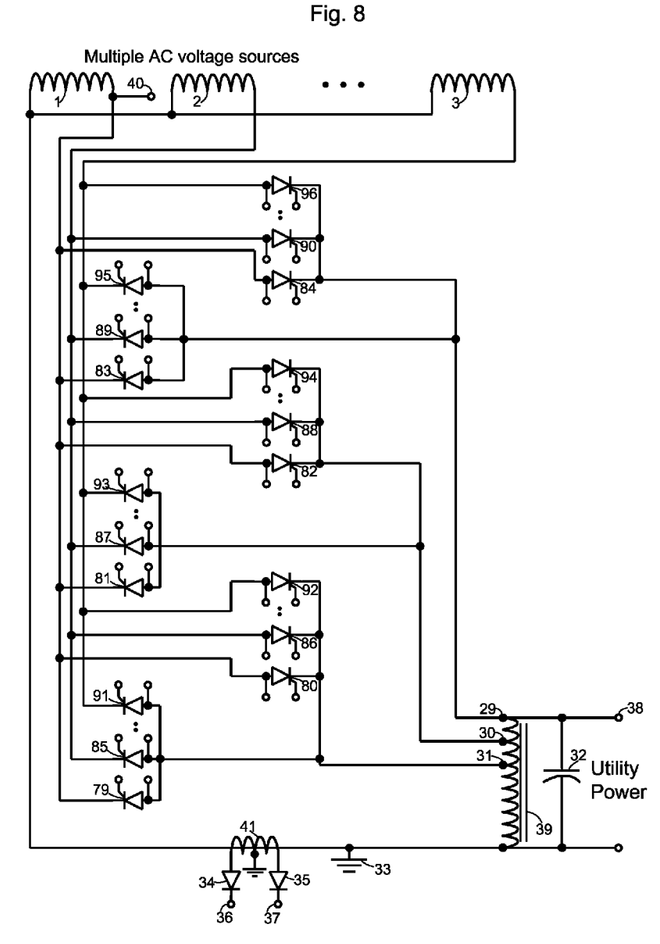
FIG. 8 shows a third embodiment of the invention that also uses SCRs to do the switching, but in this embodiment all the diodes of the previous embodiments are replaced by SCRs, which leads to the reduction of one diode in each current path, and therefore, this embodiment does not incur the losses of those diodes.

FIG. 8 illustrates the third embodiment of the invention. In this embodiment it is again assumed that the frequency of the AC input voltage waves are considerably higher than the frequency of the utility voltage wave. This assumption also allows the use of SCRs in a different manner than they were used in the second embodiment. Compared with the second embodiment, in the third embodiment all six diodes per coil are replaced by SCRs. Given that change, coil 1 is then associated with SCRs 79, 80, 81, 82, 83 and 84. SCRs 79 and 80 are connected directly with the low voltage connection 31 on the autotransformer 39, SCRs 81 and 82 are connected directly with the middle voltage connection 30 on the autotransformer and SCRs 83 and 84 are connected directly with the high voltage connection 29 on the autotransformer. Within each pair of SCRs one supports the positive voltage wave and the other supports the negative voltage wave. Coils 2 and 3 have identical sets of six SCRs associated with them as shown.

The optical coupler 70 shown in FIG. 6 is also used with this embodiment. However, since the number of SCRs, and therefore the number of optical couplers, has greatly increased, each of those control output ports (49-54 in FIG. 2) must enable as many optical couplers as there are coils, a control signal amplification circuit may be necessary to generate enough control signal power to drive them all.

The discussion of the waveforms and the triggering intervals described with the aid of FIG. 7 also applies to this embodiment.

Operation of the Third Embodiment

The operation of the third embodiment is identical to the operation of the second embodiment except for this difference. While only a single SCR needs to be turned on per conduction interval in the second embodiment, in the third embodiment many SCRs need to receive a triggering signal for each conduction interval at the same time. Therefore, as previously mentioned, control signal amplification may need to be provided to ensure that all SCR associated optical couplers receive enough control signal power to operate properly.

Possible Modifications for All Three Embodiments

Two modifications may be made in all three embodiments. First, the autotransformer 39 may be replaced by a regular transformer, if separation of the circuit ground from the ground of utility power is desired; however, an autotransformer may be considerably smaller than a regular transformer for a given power rating, because for an autotransformer a large percentage of the energy transferred is by conduction and not by transformer action. Second, the number of taps on the autotransformer, or on a regular transformer if present, may be larger or smaller than three. In fact for ac input sources that have a voltage that only varies within a narrow range, a single tap may suffice; in that case the sole control on the amount of energy transferred will be by variation of the conductance interval.

Microprocessor Peripherals

Additional peripheral devices may be attached to the microprocessor 55 (in FIG. 2) such as digital display devices to show the amount of power being transferred, or the values of measurements obtained while operating. Also, communication devices may be attached to the microprocessor for the purpose of monitoring and operating the current invention remotely.

It is understood that the foregoing detailed description is given merely by way of illustration and many modifications can be made therein without departing from the spirit or scope of the present invention.

What is claimed is:

1. An apparatus for transferring electric power from a multiplicity of alternating current sources with variable voltage and frequency characteristics to a provider of alternating electric power with constant voltage and frequency characteristics comprising:
   a. multiple sources of ac power, where the individual sources of ac power are connected to their own separate ac to dc conversion means, such that ac to dc conversion means separate the positive and negative half waves being produced by said multiple sources of ac power into a number of positive pulses of dc power and a number of negative pulses of dc power;
   b. an autotransformer connecting to the provider of ac power of constant voltage and frequency for the purpose of providing a multiplicity of voltages using multiple taps, such that an improved match can be obtained between source voltages and the voltage of the provider of ac power with constant voltage and frequency;
   c. two sets of switching means, where the first set of switching means connects the ac to dc conversion means producing positive pulses of dc power to said set of autotransformer taps for the purpose of injecting the positive pulses of dc power into the positive half wave of said provider of ac power of constant voltage and frequency, and where the second set of switching means connects the dc conversion means producing negative pulses of dc power to the same set of autotransformer taps for the purpose of injecting the negative pulses of dc power into the negative half wave of said provider of ac power of constant voltage and frequency;
   d. within each of the two sets of switching means there are exactly as many switching means as there are taps on the autotransformer, such that exactly one switching means is dedicated to each autotransformer tap for the purpose of transferring positive pulses of dc power and one switching means is dedicated to each autotransformer tap for the purpose of transferring negative pulses of dc power;
   e. controlling means to monitor a number of parameters including the maximum voltage of said provider of electric power of constant voltage and frequency, the timing of the zero crossings of said provider of ac power of constant voltage and frequency, the maximum voltage of a representative sample of said multiple sources of ac power, the timing of the zero crossing of said representative sample, the values of the positive and negative currents transferred to the provider of ac power of constant voltage and frequency;
   f. said controlling means derives from said parameters timed signals controlling said switching means for the purpose of connecting said multiple sources of ac power to the provider of ac power of constant voltage and frequency; such that the conduction interval produced by said switching means is centered with respect to each half wave of ac power with constant voltage and frequency, and the centered conduction interval's width is controlled for the purpose of controlling the amount of electric power that is transferred to the provider of ac power with constant voltage and frequency;
   g. additionally, said controlling means derives from said parameters timed signals to ensure that exactly one switching means connects to one tap of the autotransformer for each half wave of ac power with constant voltage and frequency, such that a best match is achieved between the voltages of the ac sources and the voltage at that particular autotransformer tap, where best match is defined as the lowest source voltage that is still slightly higher than the maximum voltage at the tap;
   whereby electric power is transferred efficiently from multiple sources of ac power of variable voltage and frequency to said provider of ac electric power of constant voltage and frequency.

2. The apparatus according to claim 1 wherein said multiple sources of AC power are generated by wind powered generators.

3. The apparatus according to claim 1 wherein said switching means are comprised of Insulated Gate Bipolar Transistors (IGBTs).

4. The apparatus according to claim 1 wherein said switching means are comprised of Silicon Controlled Rectifiers (SCRs).

5. The apparatus according to claim 1 wherein said autotransformer is replaced by a transformer with separate primary and secondary windings.

6. The apparatus according to claim 1 wherein said controlling means of said switching means consist of analog to digital converters delivering said parameters to a microprocessor that controls said switching means individually.

7. The apparatus according to claim 6 wherein said controlling and said switching means regulate the energy flow from said ac input sources to said provider of alternating electric power by increasing current flow, if said voltages of ac sources are increasing, and decreasing current flow, if said voltages of ac sources are decreasing.

8. The apparatus according to claim 6 wherein said controlling and said switching means maximize the energy flow from said ac input sources to said provider of alternating electric power by alternately decreasing and increasing current flow to hunt for a maximum energy transfer point.

9. An apparatus for transferring electric power from a multiplicity of alternating current sources with variable voltage and frequency characteristics to a provider of alternating electric power with constant voltage and frequency characteristics comprising:
   a. an autotransformer connecting to the provider of ac power of constant voltage and frequency for the purpose of providing a multiplicity of voltages using multiple taps, such that an improved match can be obtained between source voltages and the voltage of the provider of ac power with constant voltage and frequency;
   b. multiple Silicon Controlled Rectifiers (SCRs), which separately connect each individual ac voltage source with each tap of the autotransformer twice, once to support the positive current direction and once to support the negative current direction;
   c. controlling means to monitor a number of parameters including the maximum voltage of said provider of electric power of constant voltage and frequency, the timing of the zero crossings of said provider of ac power of constant voltage and frequency, the maximum voltage of a representative sample of said multiple sources of ac power, the timing of the zero crossing of said representative sample, the values of the positive and negative currents transferred to the provider of ac power of constant voltage and frequency;

d. said controlling means derives from said parameters timed signals controlling said SCRs for the purpose of connecting said multiple sources of ac power to the provider of ac power of constant voltage and frequency; such that the triggering interval of said SCRs is positioned within the first 100 electrical degrees in each half wave of the ac power with constant voltage and frequency, and the width of said triggering interval is controlled for the purpose of controlling the amount of electric power that is transferred to the provider of ac power with constant voltage and frequency;

e. additionally, said controlling means derives from said parameters timed signals to ensure that exactly one SCR per ac power source connects to one tap of the autotransformer for each half wave of the ac power with constant voltage and frequency, such that a best match is achieved between the voltages of the ac sources and the voltage at that particular autotransformer tap, where best match is defined as the lowest source voltage that is still slightly higher than the maximum voltage at the tap;

whereby electric power is transferred efficiently from multiple sources of ac power of variable voltage and frequency to said provider of ac electric power of constant voltage and frequency.

10. The apparatus according to claim 9 wherein said autotransformer is replaced by a transformer with separate primary and secondary windings.

11. The apparatus according to claim 9 wherein said controlling means of said switching means consist of analog to digital converters delivering said parameters to a microprocessor that controls said SCRs individually.

12. The apparatus according to claim 11 wherein said controlling and said switching means regulate the energy flow from said ac input sources to said provider of alternating electric power by increasing current flow, if said voltages of ac sources are increasing, and decreasing current flow when said voltages of ac sources are decreasing.

13. The apparatus according to claim 11 wherein said controlling and said switching means maximize the energy flow from said ac input sources to said provider of alternating electric power by alternately decreasing and increasing current flow to hunt for a maximum energy transfer point.

* * * * *